C. E. STORER.
THRESHER CONCAVE.
APPLICATION FILED JAN. 19, 1909.
934,106.
Patented Sept. 14, 1909.
2 SHEETS—SHEET 2.
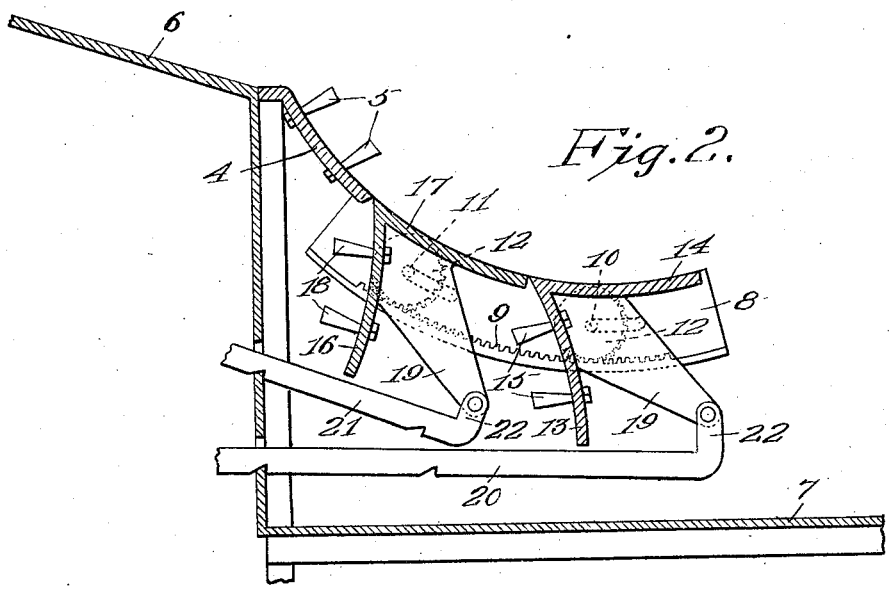
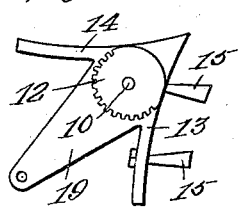
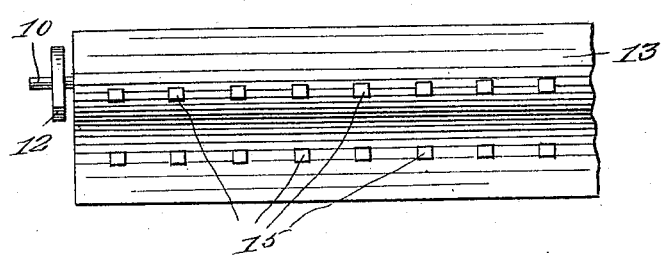
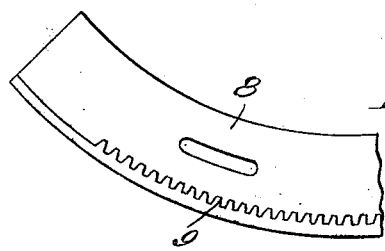
Witnesses
James F. Croyn
Fannie Jacobs
Inventor
Charles E. Storer
By Watson E. Coleman
Attorney

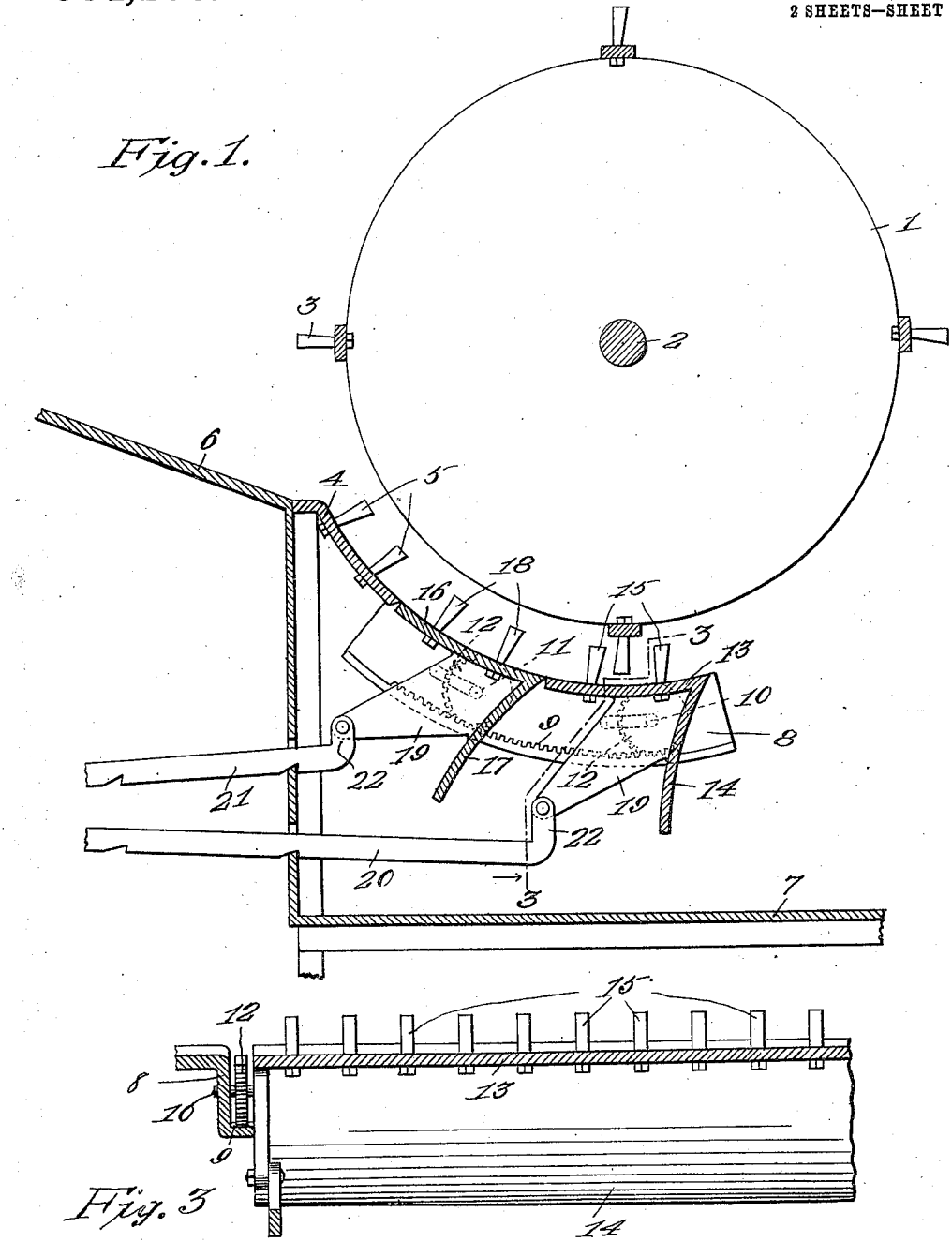

UNITED STATES PATENT OFFICE.

CHARLES E. STORER, OF KEARNEY, NEBRASKA.

THRESHER-CONCAVE.

934,106.

Specification of Letters Patent.

Patented Sept. 14, 1909.

Application filed January 19, 1909. Serial No. 473,051.

*To all whom it may concern:*

Be it known that I, CHARLES E. STORER, a citizen of the United States, residing at Kearney, in the county of Buffalo and State of Nebraska, have invented certain new and useful Improvements in Thresher-Concaves, of which the following is a specification, reference being had to the accompanying drawings.

This invention relates to improvements in concaves for threshing machines and particularly to the production of an adjustable concave.

One of the objects of the invention is the production of a concave which may be readily changed so as to alternately bring a blank concave section or a toothed concave section into operative position with relation to the thresher cylinder.

Another object of the invention is the production of a concave comprising a toothed and a blank section and means for rocking one section out of operative position and the other section simultaneously into operative position.

With the above and other objects in view this invention comprises certain combinations, constructions and arrangements of parts clearly described in the following specification and illustrated in the accompanying drawings, in which, Figure 1 is a vertical longitudinal sectional view through the front end of a thresher, Fig. 2 is a similar view showing the concave section in different positions, Fig. 3 is a transverse sectional view taken on the plane indicated by the line 3—3 in Fig. 1. Fig. 4 is an end view of a gear and rocker arm for rocking a concave section, Fig. 5 is a detail face view of a concave section, and Fig. 6 is a detail view of a gear rack.

In the accompanying drawings which are prepared for illustrative purposes and are accordingly not drawn to scale, the cylinder is designated by 1 and is supported on a shaft 2 suitably journaled to the sides of the machine, said cylinder being provided with the usual thresher teeth 3. Located beneath the cylinder and suitably supported on the machine is a fixed concave section 4 which is provided with upwardly projecting thresher teeth 5. The concave section 4 is preferably located adjacent to the feed board 6 and is formed with the usual grain slots through which grain may pass to the accumulator pan 7 located beneath the cylinder and concave section 4.

Fixed to the sides of the machine is a frame 8 having spaced arcuate slots in its end walls and provided with a longitudinally extending rack 9, located on its bottom portion. Extending across the frame 8 is a pair of shafts 10 and 11 having their opposite ends arranged for movement in the arcuate slots of the frame end walls. Mounted on the ends of the shafts 10 and 11 is a plurality of mutilated gears 12 which are adapted to engage with the gear rack 9. Supported on the shaft 10 is a pair of substantially right angularly connected concave sections 13 and 14; section 13 being formed with laterally projecting teeth 15 and section 14 being formed blank. Supported on the shaft 11 is a second set of similar concave sections 16 and 17, section 16 being provided with teeth 18 and section 17 being formed blank, and both sets of concave sections being formed with the usual grain slots.

Connected to each set of the concave sections is an arm 19 and connected pivotally to the arms 19 is a pair of operating rods 20 and 21, the rod 20 being formed somewhat longer than rod 21 and formed with an angularly bent end 22, and arranged to engage with a suitable holding means. As illustrated, the rods 20, 21 project through openings in the frame of the machine and have their bottom edges notched for engagement with the bottom walls of said openings, whereby they are held against longitudinal movement to retain the movable concave sections in adjusted position.

When the concave sections 13 and 16 are held in operative position the sections 14 and 17 will depend on the frame 8, with the rear end of section 13 held against the upper edge of section 17. By suitably manipulating the operating rods 20 and 21 the sections 13 and 16 may be independently or jointly moved out of the position shown in Fig. 1 and into the positions shown in Fig. 2 and the blank sections 14 and 17 brought from an inoperative to an operative position, these changes being effected by the rocking of the concave sections through the radial movement of the mutilated gears 12 over the gear rack 9. A simple reversible concave is therefore provided which will permit the ready change from one form to another.

I claim and desire to secure by Letters Patent:

1. A concave for threshing machines comprising a movable concave section consisting of angularly connected members or surfaces, a shaft for said movable concave section, a frame having arcuate slots to receive said shaft, a gear fixed to the shaft, a stationary gear rack for engagement by said gear and means for moving the gear over the gear rack, whereby either one of the members or surfaces of the movable concave section may be brought into operative position.

2. In combination, a rotary cylinder, a fixed concave section to co-act therewith, a movable concave section consisting of angularly connected members or surfaces, a shaft for said movable concave section, a frame having arcuate slots to receive said shaft, a gear fixed to the shaft, a stationary gear rack for engagement by said gear and means for moving the gear over the gear rack, whereby either one of the members or surfaces of the movable concave section may be brought into operative position.

3. In combination, a rotary cylinder, a fixed concave section to co-act therewith, a movable concave section consisting of angularly connected members or surfaces, a shaft for the movable concave section, a frame having arcuate slots to receive the shaft, a gear fixed to the shaft, a stationary gear rack for engagement by the gear, an arm carried by the movable concave section, an operating rod connected to said arm and means whereby said operating rod will be retained in adjusted position.

4. In combination, a rotary cylinder, a fixed concave section, a plurality of movable concave sections, each of the latter consisting of angularly connected members or surfaces, shafts for said movable concave sections, a frame having arcuate slots to receive said shafts, gears upon said shafts, a gear rack to be engaged by said gears, and means for moving said gears over the gear rack to drop one surface of each of the movable concave sections into operative position, the connected surfaces of the movable concave sections being thereby moved out of operative position.

In testimony whereof I hereunto affix my signature in the presence of two witnesses.

CHARLES E. STORER.

Witnesses:
 EDGAR STORER,
 J. A. BOYD.